United States Patent
Chen et al.

(10) Patent No.: US 11,573,347 B2
(45) Date of Patent: Feb. 7, 2023

(54) COMPUTING PROGRAM PRODUCT AND METHOD THAT INTERPOLATES WAVELETS COEFFICIENTS AND ESTIMATES SPATIAL VARYING WAVELETS USING THE COVARIANCE INTERPOLATION METHOD IN THE DATA SPACE OVER A SURVEY REGION HAVING MULTIPLE WELL LOCATIONS

(71) Applicants: China Petroleum & Chemical Corporation, Beijing (CN); Sinopec Tech Houston, Houston, TX (US)

(72) Inventors: Yequan Chen, Houston, TX (US); Fan Xia, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 36 days.

(21) Appl. No.: 17/245,347

(22) Filed: Apr. 30, 2021

(65) Prior Publication Data
US 2022/0350044 A1    Nov. 3, 2022

(51) Int. Cl.
*G01V 1/50*   (2006.01)
*G06F 17/17*  (2006.01)
*G01V 1/36*   (2006.01)

(52) U.S. Cl.
CPC ............ *G01V 1/50* (2013.01); *G01V 1/362* (2013.01); *G06F 17/175* (2013.01); *G01V 2210/512* (2013.01)

(58) Field of Classification Search
CPC .... G01V 1/50; G01V 1/362; G01V 2210/512; G06F 17/175
See application file for complete search history.

(56) References Cited

U.S. PATENT DOCUMENTS

| | | |
|---|---|---|
| 4,679,174 A | 7/1987 | Gelfand |
| 7,242,811 B2 | 7/2007 | Fenney |
| 7,477,992 B2 | 1/2009 | Deffenbaugh |
| 7,515,763 B1 | 4/2009 | Zhong |
| 8,295,124 B2 | 10/2012 | Abma |
| 8,451,683 B2 | 5/2013 | Chu |
| 9,692,619 B2 | 6/2017 | Abdoli |

(Continued)

OTHER PUBLICATIONS

Cho et al., "On the extraction of angle dependent wavelets from synthetic shear wave sonic logs", CREWES Research Report—vol. 23 (2011) (Year: 2011).*

(Continued)

*Primary Examiner* — Regis J Betsch
(74) *Attorney, Agent, or Firm* — Novick, Kim & Lee, PLLC; Allen Xue

(57) ABSTRACT

A computing program product and method for interpolating wavelets coefficients and estimating spatial varying wavelets using the covariance interpolation method in the data space over a survey region having multiple well locations, are disclosed. The method and computing program product, embodied in a non-transitory computer readable device, that stores instructions for performing by a device are based on interpolating coefficient models in the data space domain using covariance analysis methods to overcome inaccuracy and instability issues commonly observed during wavelet estimation and interpolation.

11 Claims, 10 Drawing Sheets

(56) References Cited

U.S. PATENT DOCUMENTS

| | | |
|---|---|---|
| 10,877,171 B2 | 12/2020 | Ramsay |
| 10,880,678 B1 | 12/2020 | Chabrieh |
| 10,902,088 B2 | 1/2021 | Leonard |

OTHER PUBLICATIONS

Moghanloo et al, "Application of simultaneous prestack inversion in reservoir facies identification", J. Geophys. Eng. 15 (2018) 1376-1388 (Year: 2018).*

Gunning et al., "Wavelet extractor: A Bayesian well-tie and wavelet extraction program", Computers & Geosciences 32 (2006) 681-695 (Year: 2006).*

Zhang et al., "Improving the quality of prestack inversion by prestack data conditioning", Interpretation / Feb. 2015 Society of Exploration Geophysicists and American Association of Petroleum Geologists (Year: 2015).*

S. Grace Chang, Martin Vetterli, Spatial Adaptive Wavelet Thresholding for image denoising, Dept. of Electrical Engineering & Computer Science, University of California, Berkley, pp. 374-377, 1997.

Martin J. Wainwright, Eero P. Simoncelli, Alan S. Willsky, Random Cascades on Wavelet Trees and Their Use in Analyzing and Modeling Natural Images, Applied and Computational Harmonic Analysis, vol. 11, pp. 89-123, 2001.

Douglas Nychka, Christopher Wikle, J. Andrew Royle, Multiresolution models for nonstationary spatial covariance functions, Statistical Modelling Society, vol. 2, Issue 4, First Published Dec. 1, 2002; pp. 315-331.

Alex Deckmyn, Loik Berre, A Wavelet Approach to Representing Background Error Covariances in a Limited-Area Model, American Meteorogical Society, vol. 133, pp. 1279-1294, May 2005.

Sang Soo Kim, Ill Kyu Eom, Yoo Shin Kim, Wavelet Image Interpolation Using Approximate Modeling of Exponential Decay, Department of Electronic Engineering, Pusan National University, 2006.

Anestis Antoniadis, Wavelet methods in statistics: Some recent developments and their applications, Statistical Surveys, vol. 1, pp. 16-55, 2007.

Iman Elyasi and Sadegh Zarmehi, Elimination of Noise by Adaptive Wavelet Threshold, Worid Academy of Science, Engineering, and Technology, vol. 58, 2009.

Rui Zhang, Mrinal K Sen, Sanjay Srinivasan, A prestack basis pursuit seismic inversion, Geophysics, vol. 78, No. 1, pp. R1-R11, Jan.-Feb. 2013.

Bo Y. Yi, Gwang H. Lee, Han-Joon Kim, Heyong-Tae Jou, Dong G. Yoo, Byong J. Ryu, Keumsuk Lee, Comparison of wavelet estimation methods, Geosciences Journal, vol. 17, No. 1, p. 55-63, Mar. 2013.

Sophie Achard, Irene Gannaz, Wavelet-based and Fourier-base multivariate Whittle estimation: multiwave, Journal of statistical software, University of California, Los Angeles, vol. 89, No. 6, 2019.

Joris Chau, Wavelet-based multivariate Fourier spectral estimation, https://cran.r-project.org/web/packages/pdSpecEst/vignettes/wavelet_est_clust.html, Dated Jan. 7, 2020, Retrieved Jan. 19, 2021.

* cited by examiner

COMPUTING PROGRAM PRODUCT AND METHOD THAT INTERPOLATES WAVELETS COEFFICIENTS AND ESTIMATES SPATIAL VARYING WAVELETS USING THE COVARIANCE INTERPOLATION METHOD IN THE DATA SPACE OVER A SURVEY REGION HAVING MULTIPLE WELL LOCATIONS

TECHNICAL FIELD

The present disclosure relates generally to computer program products and methods used for spatial varying wavelet estimation in seismic processing and inversion workflows that fail in presence of complex geological situ with very sparse known discrete locations and with the rapid changes of phase spectrum of wavelets therefore resulting in inaccuracy and instability.

BACKGROUND OF INVENTION

1. Overview

Seismic exploration, also called seismic surveying, involves the study of subsurface formations of interest and geological structures. In general, the purpose of seismic exploration is to image the subsurface of a survey region to identify potential locations of hydrocarbon underneath the surface.

In seismic exploration, one or more sources of seismic energy are placed at various locations near the surface of the earth to generate a signal in the form of waves, which travel downward through the earth while entering subsurface formations, like rocks, and caves. Once the waves generated as a result of the emitted seismic energy, enter the subsurface formation, they get reflected, refracted, or scattered throughout the subsurface, which are then captured by a receiving sensor that records, samples or measures said waves. The recorded waves are commonly referred to in the art, as seismic data or seismic traces. These data or traces may contain information regarding the geological structure and properties of the survey region being explored. They are then analyzed to extract details of the structure and properties of the survey region of the earth being explored.

Seismic prospecting is the first stage of the geological analysis, and its task is searching for hydrocarbon within the subsurface. It has its basis in the classical physical principles of transmission, reflection, refraction, and scattering of elastic waves in a layered solid half-space. The great increase in application of the methods and the continual effort to improve them since 1925 have resulted in elaboration and refinement of instruments, methods, systems, and interpretation techniques. It is the most expensive method of geophysical prospecting, yet the most powerful as it can map beds many thousands of feet deep and detect depth variations of the order of a few feet. The basic procedure involves generating elastic waves by a near-surface-explosion, to record the resulting waves reaching the surface at various distances, and to deduce the positions of reflecting and refracting interfaces by analysis of the travel times and characteristics of identifiable wave groups. The techniques using refracted waves differ completely from those based on reflected waves. Some common geophysical prospecting techniques known in the art include:
 a) Seismic method;
 b) Gravity method;
 c) Magnetic Method;
 d) Electrical method;
 e) Radioactive method;
 f) Well logging method; and
 g) Electromagnetic method.

Prospecting is based on the analysis of elastic waves generated in the earth by artificial means. The elastic waves produced during sudden disturbances, are often referred to as seismic waves. These seismic waves are recorded using an instrument like the seismograph, and the record obtained is the seismogram. As such, it is an important geophysical prospecting method, applied in the exploration of oil and gas deposits, deep ground water exploration, depth estimation or geotechnical problems. One skilled in the art will recognize, that seismic prospecting can be done by two methods: (a) the refraction; or (b) the reflection.

Refraction shooting method is useful only for mapping a bed in which the velocity is greater than in those above it. The shot to detector distance must be several times greater than the depth of the bed, since the refracted waves must travel a considerable horizontal distance through the bed on a minimum time path.

Reflection shooting methods uses near vertical reflections of compressional waves hence the shot to detector distance is small compared to the depth of the reflecting bed. The principal problem is to isolate the reflection from scattered waves and low velocity surface waves by filtering, mixing signals from large arrays of detectors, automatic control of gain, and advantageous arrangement of the explosive charges.

Seismic waves are further classified into the following:
 1) Compressional, longitudinal, or primary waves (P-waves). These comprises of the motion of particles in a medium with direction towards the propagation of the wave. These waves have the highest velocity, can travel through any type of material, and are generally the first to be recorded. They are formed from alternating compression and expansion movements.
 2) Shear, transverse, or secondary waves (S-waves). Occur when the motion of the particles in a medium is perpendicular to the direction of the propagation of the wave. As such, these waves can travel only through solids, as liquids or gases do not support shear stresses. Because of their direction, S-waves tend to move slower than P-waves.
 3) Surface waves (L-waves). These waves are analogous to water waves, and travel along the earth's surface. They are typically categorized as either: (a) Rayleigh waves, or (b) Love waves. The former travels in the vertical plane, but with reference to the direction of propagation, and the motion is elliptical. In love waves, the motion of the particle is horizontal and transverses to the direction of propagation.

Nevertheless, most subsurface formations of interest or geological structures have developed fractures which were originated during karstification, and this karst system was then buried underground. Therefore, the main storage space for hydrocarbon has been in caves and the fractured zones along those caves which, in a sense, made that the key content of karst characterization, to be cave identification (Fei, Tan, Zhongxing, Wang, Fuqi, Cheng, Wei, Xin, Olalekan, Fayemi, Wang, Zhang, and Xiaocai, Shan; 3-*Dimensional Geophysical Characterization of Deeply Buried Paleokarst System in the Tahe Oilfield, Tarim Basin, China*; MDPI, Basel, Switzerland; Received: 19 Apr. 2019; Accepted: 16 May 2019; Published: 20 May 2019). As this has not been an easy task, a combination approach of core sample description, well logging interpretation, and 3D seismic modeling and high-resolution impedance dataset was originally proposed by Fei Tian, supra, to delineate the 3D geometry of the paleo-caves and other paleo-karst oil fields.

2. Analysis of wavelets

The term wavelet(s) is used to refer to a set of orthonormal basis functions generated by dilation and translation of a compactly supported scaling function (or father wavelet), $\varphi$, and a mother wavelet, $\Psi$, associated with an r-regular multiresolution analysis of $L^2(R)$. In fact, the seismic wavelet is the important link between seismic data and stratigraphy as well as rock properties of the subsurface. Seismic wavelet estimation is done to deconvolve the seismic trace, tie the well log to the seismic data, design inversion operator and etc.

A variety of different wavelet families now exist that combine compact support with various degrees of smoothness and numbers of vanishing moments (See Daubechies, I. (1992), *Ten Lectures on Wavelets*, SIAM, Philadelphia, MR1162107), and these are now the most intensively used wavelet families in practical applications in statistics. Hence, many types of functions encountered in practice can be sparsely (i.e., parsimoniously) and uniquely represented in terms of a wavelet series. Wavelet bases are therefore not only useful by virtue of their special structure, but they may also be (and have been) applied in a wide variety of contexts.

When the source wavelet is known, the reflectivity or the impulse response of the earth can be obtained by deconvolution of seismic data, assuming that the noises (interferences) can be removed. In fact, most modern seismic methods require the use of wavelet information. The solution that these methods implement, which is not unique, is constrained by comparing the seismic traces with synthetic traces constructed from the convolution of the seismic model and the wavelet. The wavelet is also the key input to seismic-to-well tie.

Nonetheless, wavelets can still be measured directly during seismic data acquisition, but it requires special acquisition techniques that are both expensive and time-consuming (See Ikelle, L. T., Roberts, G., and Weglein, A. B., 1997, *Source signature estimation based on the removal of first-order multiples*, Geophysics, 62, 1904-1920). Furthermore, mismatches between recorded seismic data and synthetic traces constructed from well-log data occur very frequently (See Edgar, J. A. and van der Baan, M., 2011, *How reliable is statistical wavelet estimation?*, Geophysics, 76, V59—V68). Therefore, wavelets are more commonly estimated from seismic and well-log data using largely two method: (1) purely statistical ways and (2) the use of well-log data (White, R. and Simm, R., 2003, *Tutorial: Good practice in well ties, First Break*, 21, 75-83; and Hampson-Russell, 2007, *Strata Guide* 2007, CGGVeritas, 89 p.). The statistical method estimates the wavelet using the amplitude spectrum or autocorrelation functions of the recorded seismic data but cannot determine the phase of the wavelet without further assumptions, such as minimum phase. The reflectivity series computed from sonic and density logs can be used to estimate the wavelet with proper amplitude and phase spectra.

Particularly, spatial varying wavelet estimation interpolates the wavelets between a few known locations to provide a continuous wavelet distribution in the lateral seismic data space. Yet, because wavelet variations are a well-known problem in seismic inversion, the statistical method requires equalization of wavelets in the seismic data where the wavelets vary laterally (See Marilee, H., and G. R. Mellman, 1988, *Linearized simultaneous inversion for source wavelet equalization and mis-tie adjustment*, 58th Annual International Meeting, SEG, Expanded Abstracts, 953-955). As such, means for equalization of wavelets have been developed in order to estimate a global wavelet that can be applied at every location in the seismic data (See for instance, Palmeira, R. A. R., and R. C. Farrell, 1982, *Seismic wavelet extraction using sonic log data*, 52nd Annual International Meeting, SEG, Expanded Abstracts, 74-75; or Newman, B. J., 1985, *Deconvolution of noisy seismic data: A method for prestack wavelet extraction*, 55th Annual International Meeting, SEG, Expanded Abstracts, 501-504). However, in presence of complex geological situation, the wavelets strongly vary in both amplitude and phase. Therefore, it is preferable to apply spatial varying wavelets instead of just applying a single global wavelet or a group of global wavelets.

There are, in fact multiple other method of estimating wavelets, which can mainly be divided into four different: (1) estimation from the seafloor signal; (2) estimation fully from well-log data; (3) statistical estimation of the amplitude spectrum from seismic data and estimation of the phase spectrum from well-log data; and (4) estimation as part of sparse-spike deconvolution. Yet, regardless of the methods used, persons having ordinary skill in the art still reach results that show that the wavelet estimated from mathematically simple methods can be as effective as those estimated from more computationally rigorous methods.

In the stationary case, the seismic trace s(t) can be modeled by the convolution of the seismic wavelet w(t) and the reflectivity r(t) plus noise n(t) (See Sheriff and Geldart, 1995). Here, all the other physical effects of wave propagation such as wavefront spreading, transmission loss, multiples, attenuation, and anything else conceivable is ignored. In fact, noise n(t) is assumed to be white and stationary.

$$s(t)=w(t)*r(t)+n(t) \qquad (1)$$

Nevertheless, almost never a stationary case is observed in real life scenarios, as such, there arises a need for interpolating from irregularly spaced data to produce a continuous surface. As such, it is commonly used in the industry to interpolate wavelets in the time or frequency domain using the inverse distance weighting interpolation method (See Shepard, D., 1968, *A two-dimensional interpolation function for irregularly-spaced data*, Proceedings of the 1968 ACM National Conference, 517-524; or Marilee, H., and G. R. Mellman, 1988, *Linearized simultaneous inversion for source wavelet equalization and mis-tie adjustment*, 58th Annual International Meeting, SEG, Expanded Abstracts, 953-955; or Weiss, Y., D. Moulière-Reiser, A. Malkin, N. Grinberg, and A. Canning, 2016, *Interpolating wavelets*, 86th Annual International Meeting, SEG, Expanded Abstracts, 3641-3644). This method interpolates the wavelet as a function of a continuous parameter, given several known wavelets at discrete locations. However, the traditional means for interpolation fails in presence of very sparse known discrete locations and the rapid changes of phase spectrum of wavelets. Additionally, the direct interpolation of wavelets in presence of complex geological situation will result in inaccuracy and instability.

Notably, interpolation aims to perform two valuable roles. Firstly, it allows holes to be filled, fully or partially depending on their extent. The gaps are often related to acquisition layout or issues. Secondly it allows a person having ordinary skills in the art to increase spatial sampling density which has beneficial implications for aliasing and stack fold.

3. Conclusion

As observed from the above background, even with all the shortcomings most skilled in the art usually use a traditional approach for estimating and interpolating wavelets.

Thus, as a result it is essential to employ a novel approach for estimating the spatial varying wavelets that overcome the inaccuracies and instability issues. Furthermore, with the wider availability and access to computer program products embedded in high computational systems, these shortcomings can be avoided and large scientific and engineer problems like the foregoing be solved in a cost and time effective way.

SUMMARY OF THE INVENTION

In view of the foregoing, various embodiments of the present invention advantageously provide a computer program product, and method for estimating the spatial varying wavelets, using the covariance interpolation method to overcome the inaccuracy and instability issues observed during hydrocarbon identification, while interpolating the coefficients in the data scape instead of directly interpolation wavelets in time or frequency domains.

Typically, exploration and reservoir characterizations are performed over a region that is surveyed for its soil, and fluid potential properties. Depending upon the properties found in the survey region, one or various hydrocarbon reservoirs (i.e., oil and gas) may be revealed. Nonetheless, noise and measurement errors are introduced by the recording mediums, transmission mediums, and digitization processes used during the identification of hydrocarbon reservoirs thereby causing problems during said identification. As such, most methods that are usually implemented to solve the aforementioned problem use wavelets under the assumptions of a dyadic sample size, an equally spaced, and fixed sample points. However, data most certainly will not meet one or both of the aforementioned requires, thereby requiring the use of the present novel computer program product and method.

In one embodiment of the present invention, to perform computer program product and method of interpolating wavelets coefficients and estimating spatial varying wavelets using the covariance interpolation method in the data space over a survey region, the computer program product is operable on machine that comprises a plurality of application servers having a processor and a non-transitory memory with computer readable instructions stored thereon, each of the plurality of application servers being assigned at least one survey region and including a computer program product, operable on the memory. The computer program product operable on the non-transitory memory of the application server may perform the steps of extracting, estimating, executing, generating, selecting, computing, and repeating. Furthermore, each application server of the present invention is implemented on both CPU and GPU hardware to eliminate bottlenecks from a typical computing system's I/O, and thereby fully utilizing the computation power cluster CPUs and GPUs have, thus making the operations of estimating the spatial varying wavelets, using the covariance interpolation operation much faster, and efficient when comparing it with other wavelet estimation and interpolation methods.

In other embodiments of the present invention, the pre-processing steps include the setting up of seismic survey geometries in the data as well as imports of certain seismic data such as upscaled well logs and prestack seismic information readily available once a seismic survey over a particular region has been performed. Upon finalizing its computational processes, embodiments of the present invention generate interim results that are used by the computer program embodied in the non-transitory memory to generate final results. which typically comprises a set of spatial varying angle dependent wavelets using the generated interpolated coefficient model. Such results may store data first set up, as well as that data imported and be stored in databases located within the application servers. Further, test results showed that the present invention using computing program product and method presented herein, that interpolates wavelets coefficients and estimates spatial varying wavelets using the covariance interpolation method in the data space over a survey region, has great potential for other practical applications, as well.

Nevertheless, further details, examples, and aspects of the invention will still be described below in more detail, also referring to the drawings listed in the present invention.

BRIEF DESCRIPTION OF THE DRAWINGS

The teachings of the present invention can be readily understood by considering the following detailed description in conjunction with the accompanying drawings. As such, the manner in which the features and advantages of the invention, as well as others, which will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore are not to be considered limiting of the invention's scope as it may include other effective embodiments as well.

DETAILED DESCRIPTION OF THE INVENTION

Figure 1:
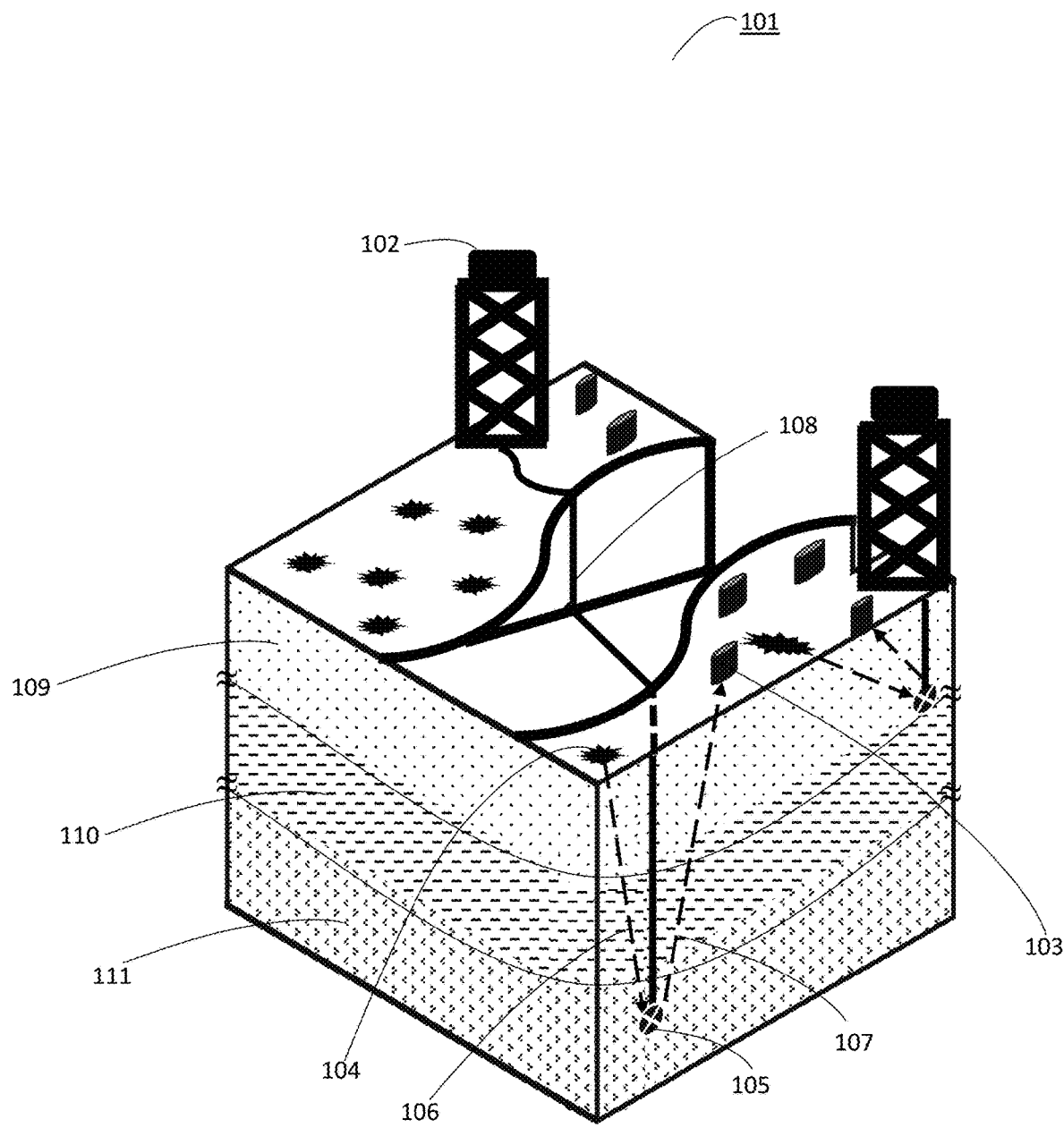
FIG. 1, is a schematic diagram showing a cross-sectional view of a survey region with a well location, source locations, receiver locations, and elements, according to an embodiment of the present disclosure.

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a system result in the execution of the method.

Additionally, the flowcharts and block diagrams in the Figures ("FIG.") illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

Any reference in the specification to a computer program product should be applied mutatis mutandis to a system capable of executing the instructions stored in the computer program product and should be applied mutatis mutandis to method that may be executed by a system that reads the instructions stored in the non-transitory computer readable medium.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

There may be provided a system, a computer program product and a method for dissipation of an electrical charge stored in a region of an object. The region of the object may be any part of the object. The region may have any shape and/or any size.

The object may be a part of the system. Alternatively, the object may be a substrate or any other item that may be reviewed by the system, inspected by the system and/or measured by the system.

As previously mentioned, exploration seismology aims at revealing the accurate location and amplitude of a target hydro carbonate within the subsurface from the prestack seismic data acquired at the earth surface. In presence of the multiples, this becomes a challenging task because the introduced errors and artifacts will significantly harm the migration, reflection tomography and velocity estimation process. To date, traditional or more advanced wavelet interpolation and estimation methods have failed in presence of very sparse known discrete well locations as well as due to the rapid changes of phase spectrum of wavelets. Additionally, the direct interpolation of wavelets in presence of complex geological situation have further resulted in inaccuracy and instability that had to be corrected by the implementation of additional methods.

Therefore, embodiments of the present invention are based on spatial varying wavelet estimation based on covariance interpolation techniques, wherein a global (survey region) angle-dependent wavelet is combined with local (at well locations) angle-dependent wavelets to interpolate coefficients in the data space instead of directly interpolating wavelets in time or frequency domain as currently done by traditional methods.

Furthermore, embodiments of the present invention simplify the seismic processing in the data domain, which in turns reduces the time and computational-consuming seismic processing, to an acceptable turnaround time. Additionally, embodiments of the present invention introduce a coefficient model m as a three-dimensional (3D) table that stores the various interpolation coefficient with a coefficient index as a first dimension (1D), a well location as a second dimension (2D), and a reflection angle as the third dimension (3D) thereby demonstrating its superiority over 2D/3D synthetic, and real datasets when compared against traditional wavelet estimation and interpolation methods.

Turning over to FIG. 1, it represents a typical survey region 101, over a land-based region, showing different types of earth formation, 109, 110, 111, in which an embodiment of the present invention is useful. Persons of ordinary skill in the art, will recognize that seismic survey regions produce detailed images of local geology in order to determine the location and size of possible hydrocarbon (oil and gas) reservoirs, and therefore a well location 105. Nevertheless, as observed in FIG. 1, when using MWD downhole systems 108 during directional drilling, in order to reach the well or reservoir 105, the MWD downhole system 108 must deviate from a vertical downward trajectory, to a trajectory that is kept within prescribed limits of azimuth and inclination to reach a well or reservoir 105. This degree of deviation is given by a myriad of situations, but most likely due to populated or obstructed areas.

In these survey regions 101, sound waves bounce off underground rock formations during blasts at various points of incidence, sources, or shots 104, and the waves (or wavelets) 107 that reflect back to the surface are captured by seismic data recording or receiving sensors, 103, transmitted by data transmission systems 502, wirelessly, from said sensors, 103, then stored for later processing, and analysis by the computing program product, embodied in a non-transitory computer readable device, that stores instructions for performing by a device, the method 201. These location at which the reflection images are gather are referred to as common image locations.

In particular, persons having ordinary skill in the art will soon realize that the present example shows a common midpoint-style gather, wherein seismic data traces are sorted by surface geometry to approximate a single reflection point in the earth. In this example, data from several shots and receivers may be combined into a single image gather or used individually depending upon the type of analysis to be performed. Although the present example may illustrate a flat reflector and a respective image gather class, other types or classes of image gathers known in the art maybe used, and its selection may depend upon the presence of various earth conditions or events. As shown on FIG. 1, the reflections captured by the multiple seismic data recording sensors 103, each of which will be placed at different location offsets from each other, and the well 105. Because all points of incidences or shots 104, and all seismic data recording sensors 103 are placed at different offsets, the survey seismic data or traces, also known in the art as gathers, will be recorded at various angles of incidence represented by reflections to (downward transmission rays) 106 and from (upward transmission reflection) 107 the reservoir 105. Well location 105, in this example, is illustrated with an existing drilled well attached to a wellbore, 102, along which multiple measurements are obtained using techniques known in the art. This wellbore 102, is used to obtain well log data, that includes P-wave velocity, S-wave velocity, Density, among others. Other sensors, not depicted in FIG. 1, are placed within the survey region to also capture horizons data information required for interpreters and persons of ordinary skilled in the art to perform various geophysical analysis. In the present example, the gathers will be sorted from field records in order to examine the dependence of amplitude, signal-to-noise, move-out, frequency content, phase, and other seismic attributes, on incidence angles, offset measurements, azimuth, and other geometric attributes that are important for data processing and imaging and known by persons having ordinary skills in the art.

A receiving system or sensor as used herein, typically includes at least hardware capable of executing machine readable instructions, as well as the software for executing acts (typically machine-readable instructions) that produce a desired result. In addition, a retrieving system may include hybrids of hardware and software, as well as computer sub-systems.

Figure 2:
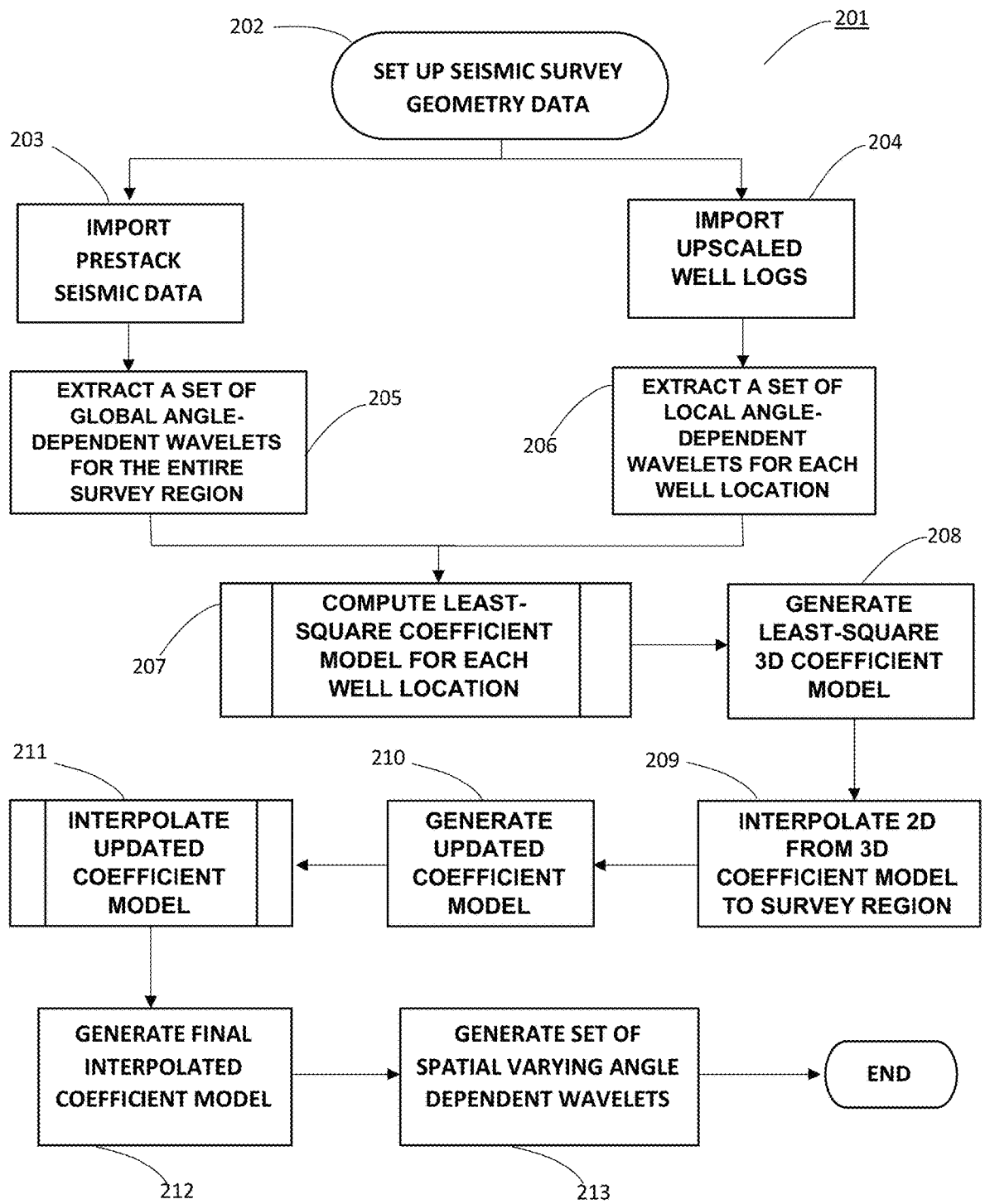
FIG. 2, illustrates a flow chart of the method and instructions to be executed by a computer program product embodied in a non-transitory computer readable device, that stores instructions for performing, by a device, a method that interpolates wavelets coefficients and estimates spatial varying wavelets using the covariance interpolation method in the data space over a survey region, according to an embodiment of the present disclosure.

Turning over to FIG. 2, 201 illustrates a flow chart of the method and instructions to be used in a computer program product embodied in a non-transitory computer readable device, that stores instructions for performing by a device a method that interpolates wavelets coefficients and estimates spatial varying wavelets using the covariance interpolation method in the data space over a survey region having multiple well locations. The method and instructions to be used in a computer program product embodied in a non-transitory computer readable device, that stores instructions for interpolating wavelets coefficients and estimating spatial varying wavelets using the covariance interpolation method in the data space over a survey region having multiple well locations, 201. The method begins by defining seismic survey geometry at 202 from survey region 101. In particular, the method starts when the application server device, 505, receives a message hook from the telemetry system 502 that it has started importing data from a plurality of receiver sensors 103 located over a defined survey region 101, containing a set of prestack seismic data 203, and upscaled well log data 204 from the survey region. Nevertheless, a person having ordinary skills in the art, will soon realize that the imported data 203 and 204 may also be imported in a variety of other ways, like from an external database already containing said data, from a variety of seismic surface or subsurface seismic tomography surveys, as well as preloaded to the memory resource 503. The prestack seismic data 203 are typically the post-migrated angle image gathers with reflection angle traces as the horizontal axis and time as the vertical axis. On the other hand, the upscaled well log data 204 include the P-wave velocity, the S-wave velocity and the density in the time domain.

Figure 6:
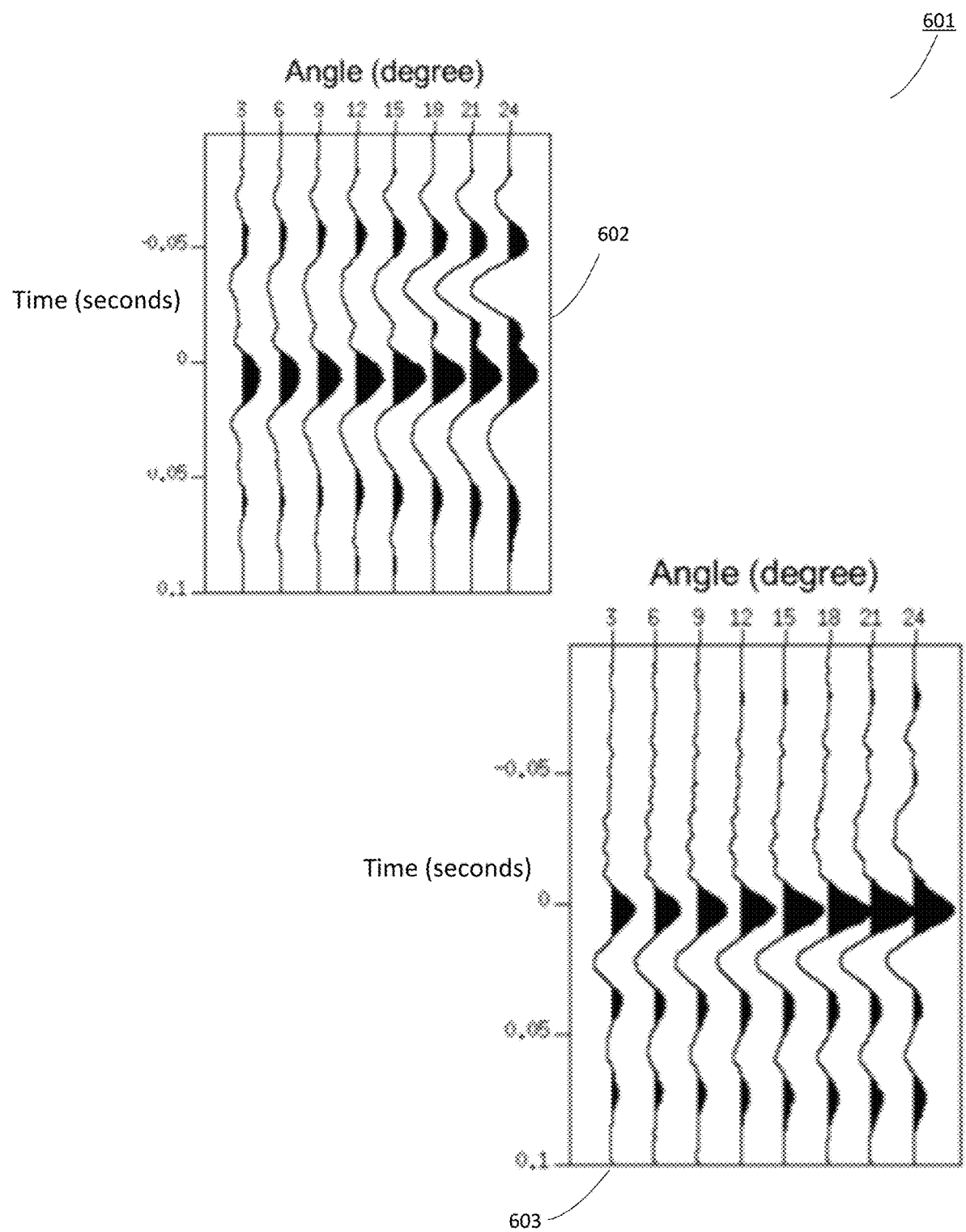
FIG. 6, illustrates the global angle-dependent wavelets and the local angle-dependent wavelets that are estimated at two well locations, according to an embodiment of the present disclosure.

Once said 203 and 204 has been imported to the application server 505, the non-transitory computer readable device, 506 will message the memory resource 503, of the computing program product embodied in a computing system device 501, to begin executing at 205 and 206 a multi-thread two-part routine, which includes the extraction (also known in the art as estimation) of a global angle-dependent wavelet for the whole survey and the extraction of local angle-dependent wavelets at each well location over the survey region 101. The global- and local angle dependent wavelets can be estimated using the statistical wavelet extraction method with the calibration of well log reflectivities, 107, by means of seismic-to-well tie and inverting the angle traces of said well-log reflectivities 107. In other instances, a person having ordinary skills in the art may import from third party software like HampsonRussell extracted global and local wavelets too. FIG. 6 shows in 601 a set of global angle-dependent wavelets 602 and a set of local angle-dependent wavelets 603 that are estimated at two different well locations 103.

Figure 3:
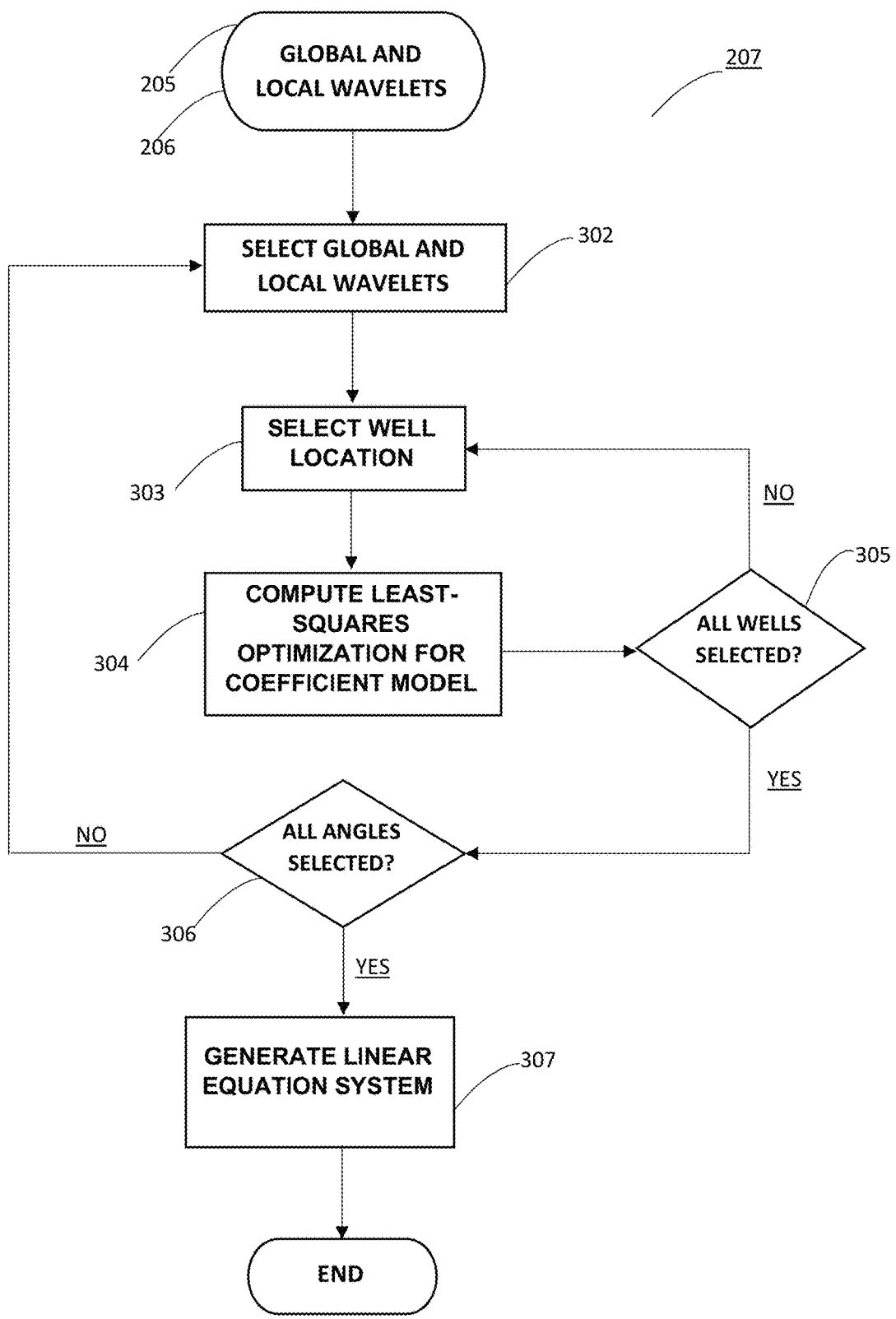
FIG. 3, illustrates a flow chart of the sub-routine of executing a computer program product for computing a least-square coefficient model for each well location of the survey region, using the estimated global angle-dependent wavelet and the estimated set of local angle-dependent wavelets, according to an embodiment of the present disclosure.

After the extraction process 205 and 206 have been executed by the non-transitory computer readable device, 506 embedded in the application server 505, the non-transitory computer readable device, 506 will trigger the execution of sub-routine 206 of computing the least-squares optimized coefficient model at all well location 103. At this point, the sub-routine illustrated in FIG. 3 starts by utilizing the extracted global angle-dependent wavelets 205, and the extracted local-angle dependent wavelets 206, as inputs. The computer program product embedded in the non-transitory computer readable device, 506 of the application server 505, at this sub-routine has the sole outcome of obtaining the coefficient model m. As such, sub-routine 207 of FIG. 3 does this by selecting at 302 the extracted global angle-dependent wavelets for the survey region, and the extracted set of local angle-dependent wavelets 107 for each well location as well as selecting a well location 303 from the survey region 101. The selected global angle-dependent wavelets, local angle-dependent wavelets, and well locations done at 302 and 303 will be saved to the memory resource 503, before the next steps begin as further down the sub-routine an iteration step will be required. Thereafter, the memory resource 503, will send a message hook to the non-transitory computer readable device, 506 of the application server 505, to begin computing at 304 the least-squares optimization for coefficient model according to the expression:

$$d=Fm \quad (2)$$

The first coefficient model $m_i$ will be generated and stored in the memory resource 503, before the non-transitory computer readable device, 506 of the application server 505, begins repeating at 305 the steps of selecting a well location 303 from the survey region and computing the least-squares optimization 304 until all well locations from the survey region have been selected. Once all well locations have their respective least-squares optimization coefficient model calculated, the non-transitory computer readable device, 506 of the application server 505, stores them within the memory resource 303 for further processing. Similarly, the non-transitory computer readable device, 506 of the application server 505, begins repeating at 306 the step of selecting the extracted global angle-dependent wavelets for the survey region and the extracted set of local angle-dependent wavelets for all well locations 302, the step of selecting a well location 303 from the survey region, the step of computing the least-squares optimization 304, and the step of selecting a particular well location 305; until all local angle-dependent wavelets for all well locations have been selected. For each reflection angle selected at 306 and at each well location selected 305, a linear equation system is built at 307 by the non-transitory computer readable device, 506 of the application server 505, that combines those trace selections, and the coefficient model for each angle and well location is computed using multivariate regression to the objective function according to the expression:

$$\Psi=\min\|\Delta d-Fm\|_2 \quad (3)$$

Figure 7:
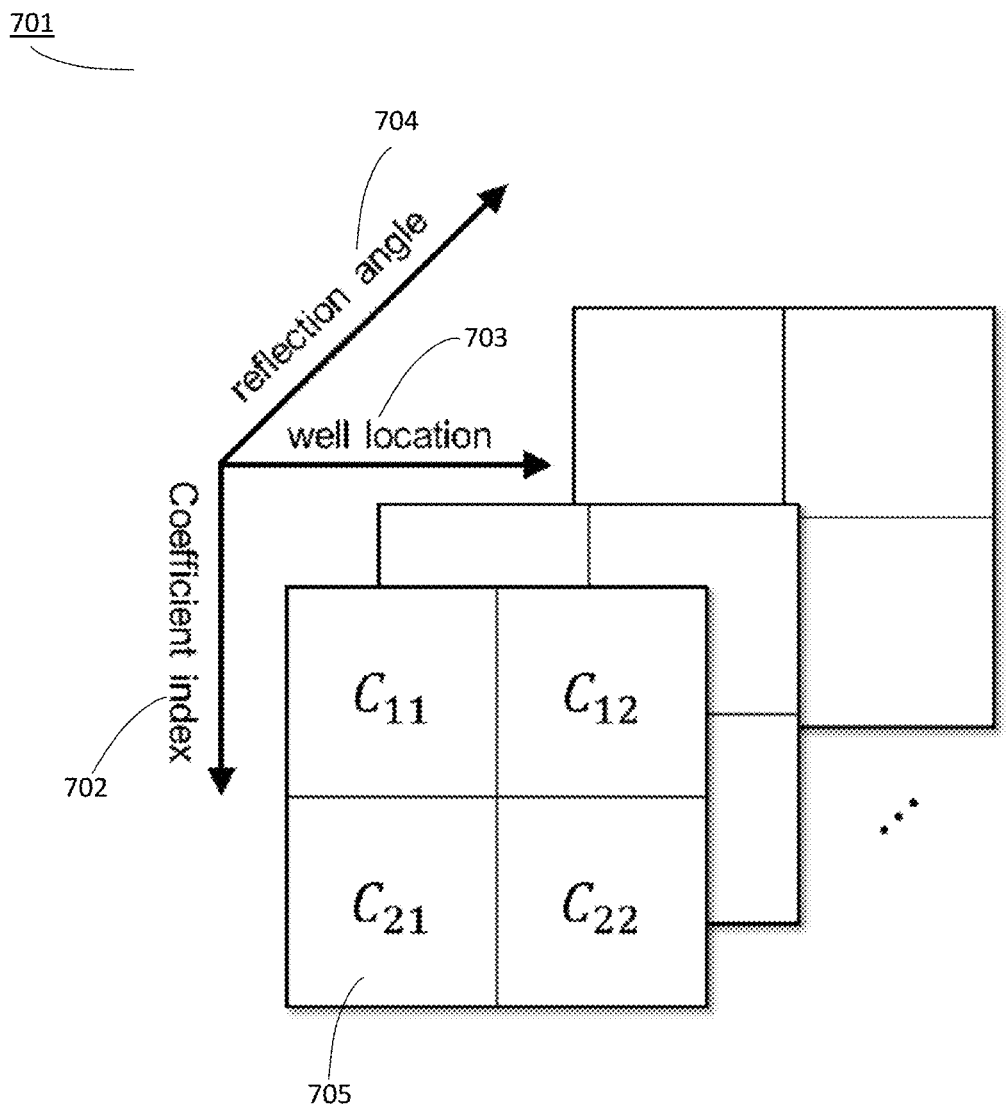
FIG. 7, illustrates a schematic diagram for the 3D coefficient model m, that stores the interpolation coefficients with the respective coefficient indexes as the first dimension, the well location as the second dimension, and the reflection angle as the third dimension, according to an embodiment of the present disclosure.

The multivariate regression linear equation system built at 307, with the respective coefficient models for each angle and well location are then generated and stored at 208 by the non-transitory computer readable device, 506 of the application server 505, to the memory resource 503 after using the conjugate gradient method. From the system built at 307, a 3D coefficient model is generated and stored as well wherein the different dimensions comprise of a coefficient index as a first dimension (1D), a well location as a second dimension (2D), and a reflection angle as the third dimension (3D). An exemplary schematic diagram generated and stored at step 208 for the 3D coefficient models m, that stores the interpolation coefficients with the respective coefficient indexes as the first dimension, the well location as the second dimension, and the reflection angle as the third dimension is illustrated by FIG. 7.

Furthermore, the aforementioned multivariate regression linear equation system built also comprises of a Δd that denotes the data difference between the global wavelet and the local wavelet at the specific well location, and F is the operator that contains all the local wavelets. Nonetheless, because in a typical survey region there will exist multiple well locations and wavelets, the non-transitory computer readable device, 506 of the application server 505, will evaluate the computing program's utilization of the computing system device 501 in order to determine whether the subroutine within 207 will be performed in parallel or in sequence with a typical resource (CPU, GPU, and memory) utilization of less than 70%.

Accordingly, once the non-transitory computer readable device, 506 of the application server 505, stored the 3D coefficient models, the memory resource 503 will message the non-transitory computer readable device, 506 of the application server 505, to begin executing, at 209, a computer program product for interpolating the second dimension of the generated three-dimensional coefficient model from each well location to the entire survey region. This interim step is required in order to obtain a geological reasonable result. Then, an updated least-square coefficient model from the interpolated second dimension of the generated three-dimensional coefficient model is generated at 210. The completion of this step triggers the non-transitory computer readable device, 506 of the application server 505, to store the generated updated coefficient models, to the memory resource 503 which instead messages the non-transitory computer readable device, 506 of the application server 505, to initiate the next subroutine. In fact, the next step involves subroutine 211 of interpolating the coefficient model to the whole survey based on covariance analysis technique. This step is further broken down in FIG. 4 as processed by the non-transitory computer readable device, 506 of the application server 505.

Figure 4:
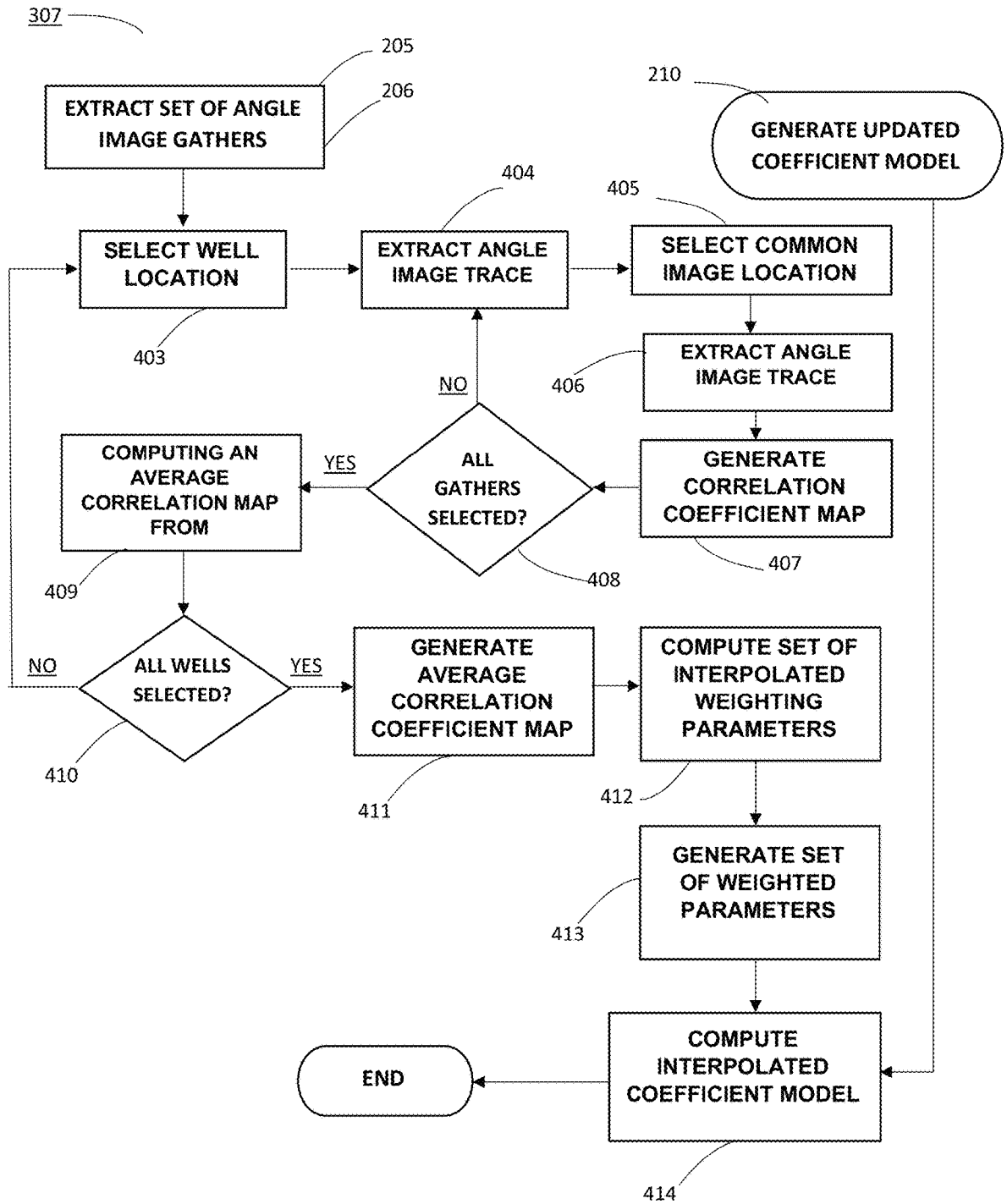
FIG. 4, illustrates a flow chart of the sub-routine of executing a computer program product for interpolating the generated updated coefficient model of each well location to the entire survey region and the location from the imported prestack seismic data from the survey region, using the covariance analysis technique, according to an embodiment of the present disclosure.

Sub-routine 211 of FIG. 4 uses as input data, the extracted post-migrated angle image gathers for the whole survey (205 and 206) and the updated least-square coefficient models (210) saved to the memory resource 503. As previously mentioned, a survey region consists of multiple well location 102 as well as common image locations captured by receiving sensors 103. Each well location has an angle image gather and each common image location also has its unique angle image gather. The angle image gathers for both locations are further divided into angle image traces. During this subroutine, the computer program product goes through each angle image gather of each well location and common image locations, to extract their respect angle traces, and then correlates them one by one into a correlation map. This is achieved when the non-transitory computer readable device, 506 of the application server 505 selects a well location at 403 and extracts an angle image trace at 404 from the selected well location. The non-transitory computer readable device, 506 of the application server 505 selects a common image location at 405, corresponding to the selected well location of 403. Each well location and corresponding common image location will have a unique common identifying number that the non-transitory computer readable device, 506 of the application server 505 will recognize as a match thereby avoiding selecting a common image location not belonging to a corresponding well location. Thereafter, the non-transitory computer readable device, 506 of the application server 505 begins extracting a seismic trace of a reflection angle in the angle image gather of the common image location, at 406. Upon successfully completing step 406, the non-transitory computer readable device, 506 of the application server 505, generates at 407 a correlation coefficient map by computing correlation coefficients between the selected angle seismic traces of the well location 404 and that of the common image location 406.

Figure 8:
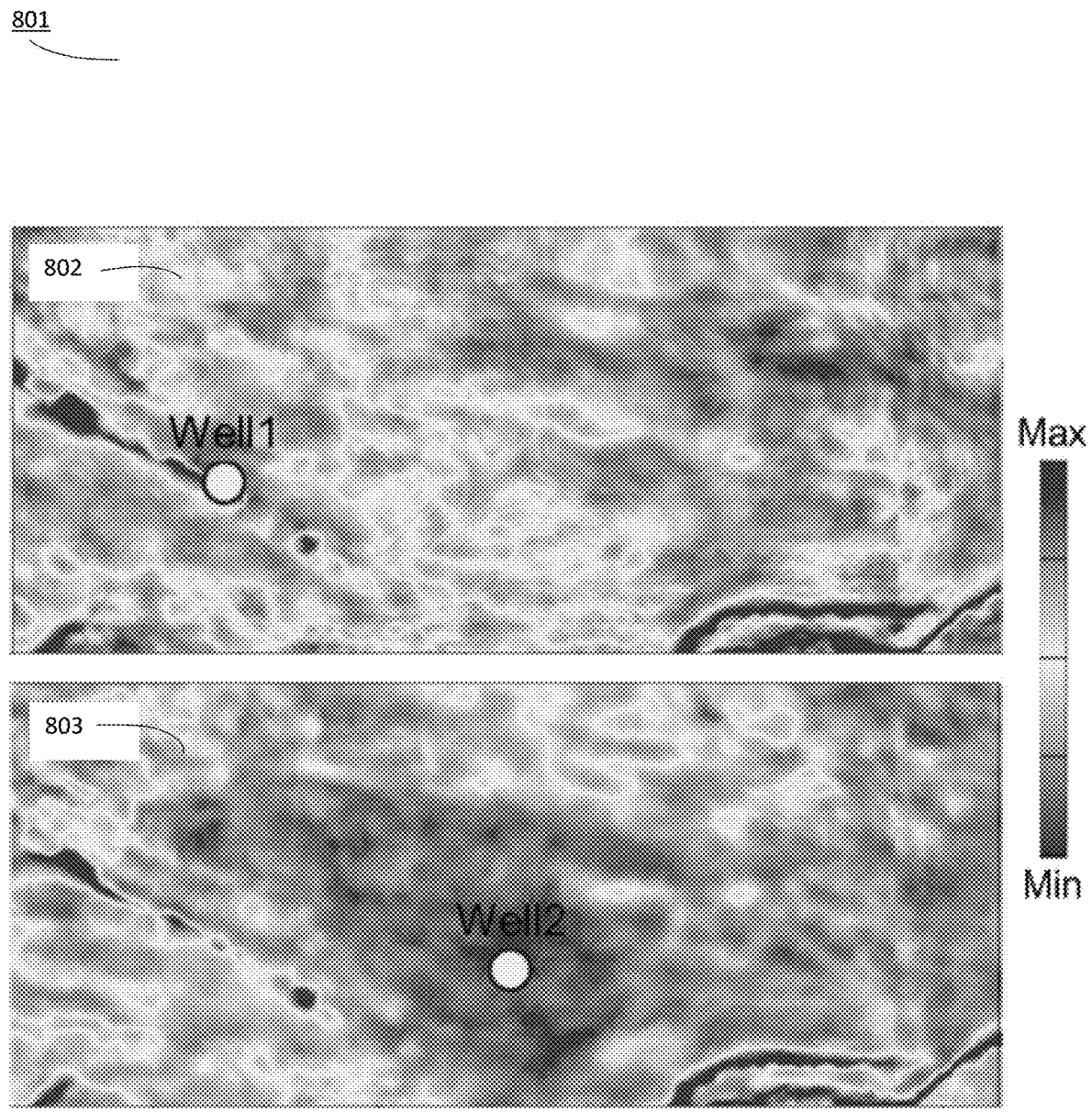
FIG. 8, illustrates the average correlation maps for at 2 well locations over a survey region, according to an embodiment of the present disclosure.

This process is partially completed until all reflection angles from the selected locations are inputted into the correlation coefficient map during said step 407. The process then gets repeated at 408 for every corresponding common image location for the selected well location, which yields an intermediate outcome of an average correlation coefficient maps for all reflection angles of a single well location computed at 409. Nonetheless, because survey regions have more than one well, these average correlation maps will need to be further processed at 410 until all angle image traces for each well locations with its corresponding angle image trace of each common image location have been correlation, and an updated correlation coefficient map is generated that contains all wells of the survey region with their respective common image location. Once all well locations are selected at 410 a set of average correlation maps at each well location is generated at 411 and the non-transitory computer readable device, 506 of the application server 505, stores said set of average correlation maps at each well location to the memory resource 503. In fact, the non-transitory computer readable device, 506 of the application server 505 stores, to the memory resource 503 in graphical representation said average coefficient models as illustrated by FIG. 8. These two images (802 and 803) show two correlation maps for two different wells (Well1 and Well2), as stored by the non-transitory computer readable device, 506 of the application server 505.

Thereafter, the memory resource 503 messages the non-transitory computer readable device, 506 of the application server 505, to begin step 412 of computing a set of interpolated weighting parameters from the generated set of average correlation maps at each well location. The formulation for calculating the interpolated weighting parameters (p) at a given point (x) over the survey region 101, is based on the values extracted from the set of average correlation maps and can be expressed as follows:

$$p_i(x) = \begin{cases} \dfrac{\hat{v}_i(x)}{\sum_{i=1}^{N}\hat{v}_i(x)}, & \text{if } v_i \neq 1 \text{ for all } i, \\ 1, & \text{if any } v_i = 1 \text{ for some } i, \end{cases} \quad (4)$$

Accordingly in expression (4), $\hat{v}$ denotes the mathematical transformation from v with power parameter and N denotes the number of well locations. Then a generated set of weighted parameters from the computed set of interpolated weighting parameters are further stored at step 413 by the non-transitory computer readable device, 506 of the application server 505 into the memory resource 503 at each well. Thereafter, the memory resource 503 messages the non-transitory computer readable device, 506 of the application server 505, to compute at 414 an interpolated coefficient model for every extracted reflection angle seismic trace, using the generated set of weighted parameters at 413 and the generated updated least-square coefficient model at 210 for the survey region at all well locations according to expression:

$$C_{ik}(x) = \Sigma_{j=1}^{N} p_j(x) C_{ijk} \quad (5)$$

Figure 9:
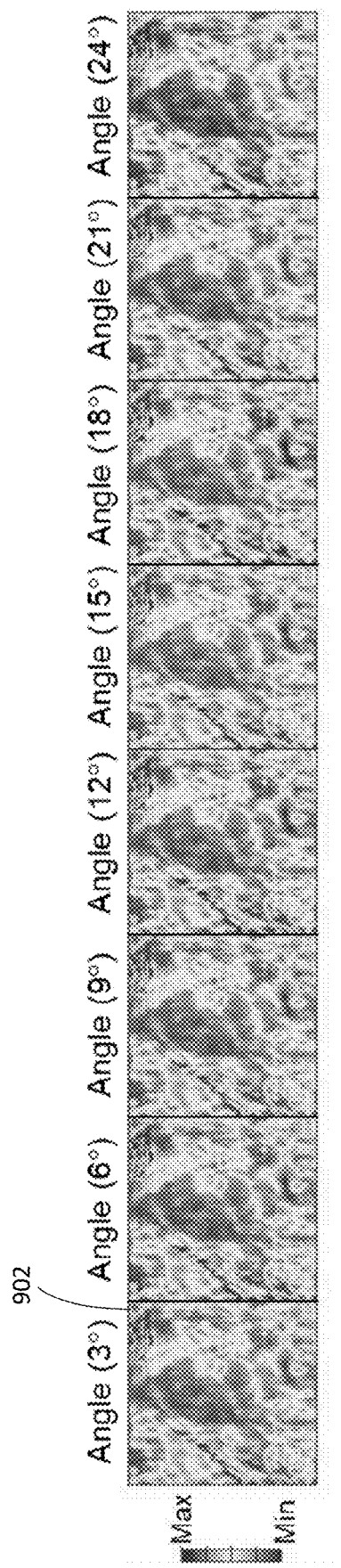
FIG. 9, illustrates the final coefficient models for two coefficients in the whole survey region, according to an embodiment of the present disclosure.
Figure 9:
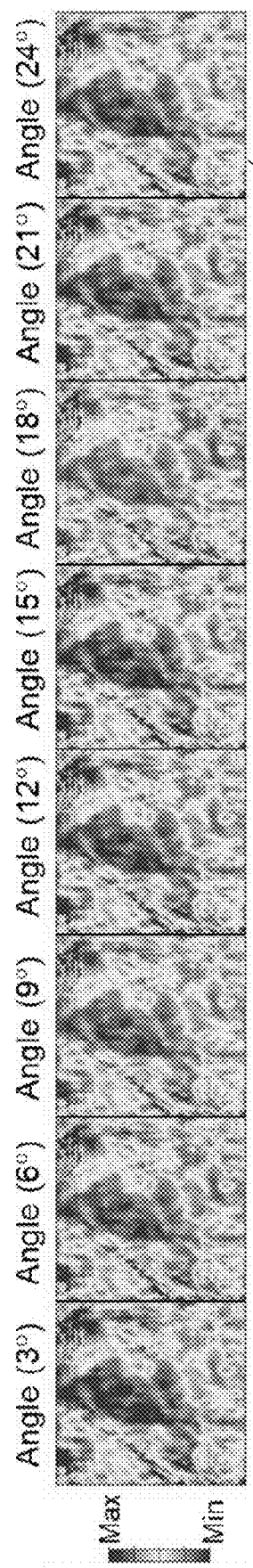

From the above expression (5), the subscript i denotes the index of coefficient, j denotes the index of well location and k denotes the reflection angle, respectively. Nonetheless, the non-transitory computer readable device, 506 of the application server 505 will only message the memory resource 503 to begin generating and storing the final interpolated coefficient models at step 212, when all reflection angles are selected. An example of the final interpolated coefficient models for two coefficient models (902 and 903) in the whole survey region are shown by FIG. 9.

The last step, 213, of the computing program product, embodied in an application server, involves generating, by the non-transitory computer readable device, 506, a set of spatial varying angle dependent wavelets w using the generated final interpolated coefficient model, according to expression:

$$w_k(x) = w_G^k + \Sigma_{i=1}^{M} C_{ik}(x) w_L^{ik} \quad (6)$$

Figure 10:
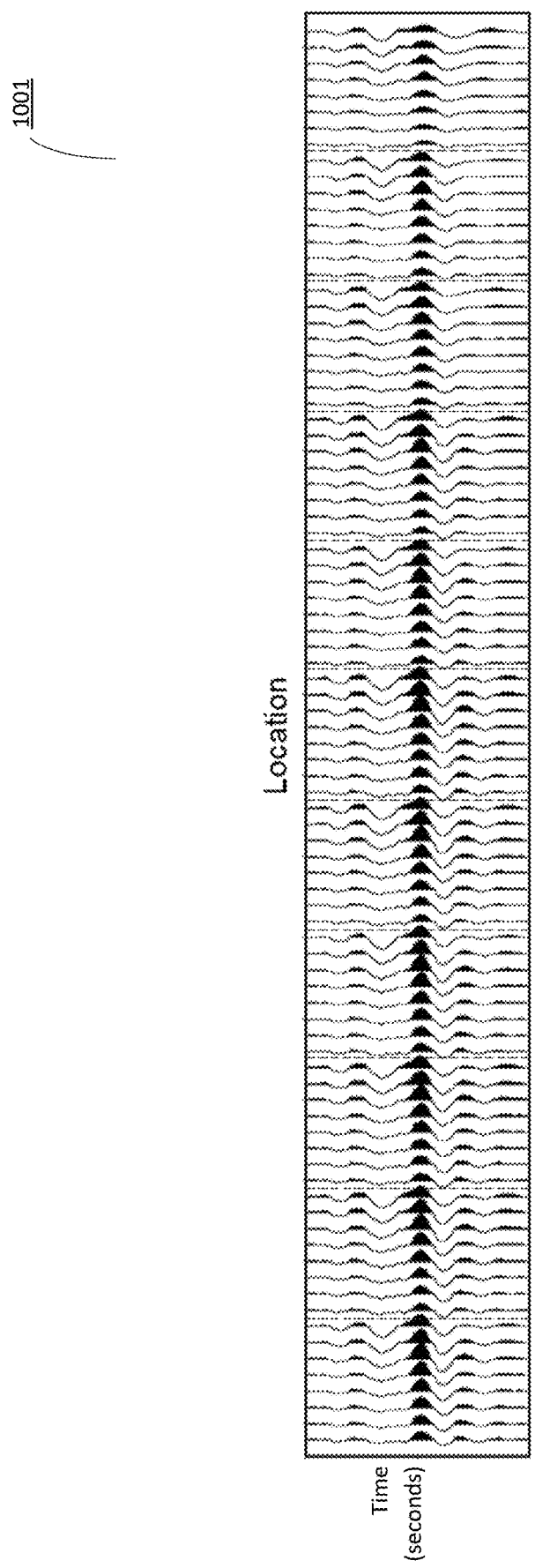
FIG. 10, illustrates a graphic representation the generated final set of spatial varying angle dependent wavelets using the generated interpolated coefficient model of FIG. 9, as executed by the computer program product, according to an embodiment of the present disclosure.

Nonetheless, the non-transitory computer readable device, 506 of the application server 505 will not only compute the above expression but also generate a graphical representation 1001 of the final spatial varying wavelets as illustrated by FIG. 10. Said graphical representation is then stored by the non-transitory computer readable device, 506 to the memory resource 503 who will then message the computer system device 508, to display in a computer monitor a message indicating its user, typically a person having ordinary skills in the art, that the computing program product, embodied in an application server has completed its instructions.

Figure 5:
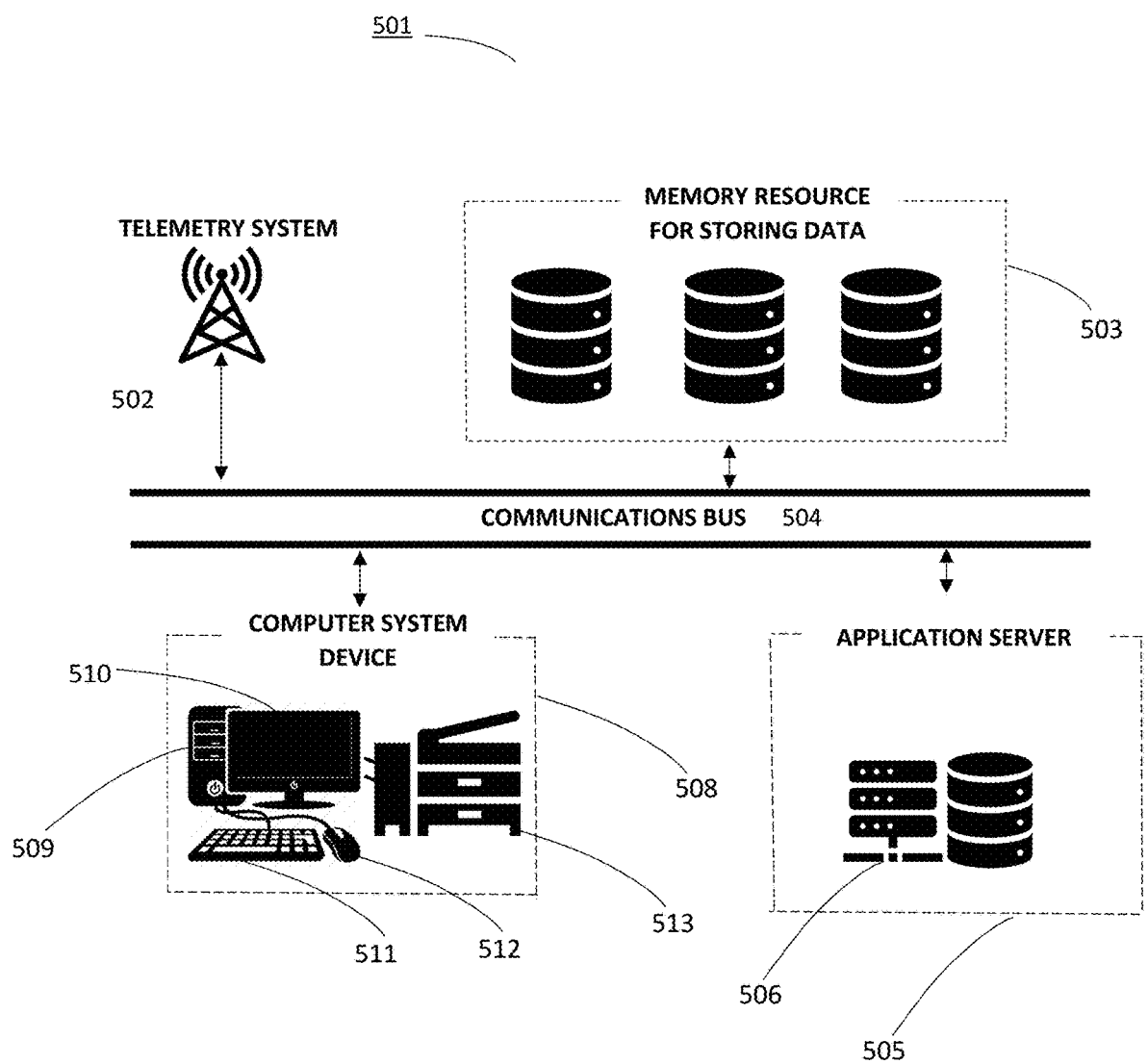
FIG. 5, is an electric diagram, in block form of an application server with a computing program product embodied in a non-transitory computer readable device, used in the distributed network that store instructions for performing, by a device, a method that interpolates wavelets coefficients and estimates spatial varying wavelets using the covariance interpolation method in the data space over a survey region, according to an embodiment of the present disclosure.

In fact, as it pertains to FIG. 5, the computing program product, embodied in an application server, is part of a computing system device 501 which is shown to compile the information from the various application servers 505 that are placed at different survey regions. Said computing system device 501 is shown typically comprising a telemetry system 502, a memory resource for storing data 503, a communication bus 504, an application server 505, and a computer system device that is used as a user-interface, 508. This computing system device 501, illustrated as a functional block diagram performs an array of operations and instructions for the method that interpolates wavelets coefficients and estimates spatial varying wavelets using the covariance interpolation method in the data space over one survey region having multiple well locations and that can easily be replicated on other survey regions.

The memory resource 503 may include any of various forms of memory media and memory access devices. For example, memory devices 503 may include semiconductor RAM and ROM devices as well as mass storage devices such as CD-ROM drives, magnetic disk drives, and magnetic tape drives.

The computer system device, 508, acts as a user interface the non-transitory computer readable device, 506 of the application server 505; to input, set, setup, select, and perform the operations of extracting, storing, computing, generating, retrieving, interpolating, and repeating, (collectively the message hook procedures). Said computer system device, 508, is connected to (wired and/or wirelessly) through a communication device 504 to the telemetry system 502, to the memory resource 503, and to the application server 505. The computer system device, 508, further includes other devices like a central processing unit (CPU), 509, a display or monitor, 510, a keyboard, 511, a mouse, 512, and a printer, 513. One or more users may supply input to the computing program product embodied in a computing system device 501 through the set of input devices of the computing system 508 like 511 or 512. Nevertheless, a person having ordinary skills in the art will soon realize that input devices may also include devices such as digitizing pads, track balls, light pens, data gloves, eye orientation sensors, head orientation sensors, etc. The set of output devices 510 and 513 may also include devices such as projectors, head-mounted displays, plotters, etc.

In one embodiment of computing program product embodied in an application server making up a computing system device 501 may include one or more communication devices (communications bus) 504, like network interface cards for interfacing with a computer network. For example, seismic data gathered at a remote site may be transmitted to the computing program product embodied in an application server making up a computing system device 501 using a telemetry system 502, through a computer network. The computing program product embodied in a computing system device 502 may receive seismic data, coordinates, elements, source and receiver information from an external computer network using the communication's bus 504 network interface card. In other embodiments, the computing program product embodied in an application server making up a computing system device 501 may include a plurality of computers and/or other components coupled over a computer network, where storage and/or computation implementing embodiments of the present may be distributed over the computers (and/or components) as desired.

The computing program product embodied in an application server making up a computing system device, 501, has firmware, a kernel and a software providing for the connection and interoperability of the multiple connected devices, like the telemetry system 502, the memory resources for storing data, 503, the communication bus 504, the non-transitory computer readable device, 506, and the computer system device, 508. The computing program product embodied in an application server making up a computing system device, 501, includes an operating system, a set of message hook procedures, and a system application.

Furthermore, because performance and computation costs are always an important issue, the computing program product embodied in an application server making up a computing system device, 501, uses the non-transitory computer readable device, 506 to ensure that the steps of the method 201 will not be bottlenecked by the computing system (501) I/O, or any other network communications. In fact, file-distribution systems like Apache Hadoop in combination with proper data-compressions, as well as smart file caching according to the data will ensure that the operations or instructions performed by the computer program product, 201, as shown on of FIG. 2; are only limited by the memory/cache speed and CPU/GPU computing power, and nothing else.

The operating system embedded within the computing program product embodied in a computing system device 501, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of computing program product embodied in a computing system device 501 may, for example, represent an operation or command of the memory resources, 503, the computer system device, 508, the non-transitory computer readable device, 506, which may be currently executing a certain step process or subroutine from the method 201, as shown on of FIG. 2.

The set of message hook procedures may be first initiated by: (i) an input from a user, which will typically be a person having ordinary skills in the art, like the entering of user-defined values or parameters; (ii) the manipulation of the computer system device, 508; (iii) the processing of operations in the non-transitory computer readable memory device, 506; or (iv) automatically once certain data has been stored or retrieved by either the memory resources, 503, or the non-transitory computer readable memory device, 506. Based on any of these inputs, processes or manipulation events, the memory resource, 503, the non-transitory computer readable memory device, 506, or the computer system device, 508; generate a data packet that is passed using the communication bus, 504, which are indicative of the event that has occurred as well as the event that needs to occur. When either the memory resource, 503, the non-transitory computer readable device, 506, or the computer system device, 508, receive the data packet, they convert it into a message based on the event, and executes the required operations or instruction of 201. This is achieved when the operating system examines the message hook list and determines if any message hook procedures have registered themselves with the operating system before. If at least one message hook procedure has registered itself with the operating system, the operating system passes the message via the communication bus 504 to the registered message hook procedure that appears first on the list. The called message hook executes and returns a value to either the memory resource, 503, the non-transitory computer readable memory device, 506, or the computer system device, 508, instructing them, to pass the message to the next registered message hook, and either the memory resource, 503, the non-transitory computer readable memory device, 506, or the computer system device, 508. The computing program product embodied in a computing system device 501, continues executing the operations until all registered message hooks have passed, which indicates the completion of the operations or instruction 201, by the generation and storing of a set of final spatial varying wavelets, to the memory resource, 503.

The non-transitory computer readable device, 506, is configured to read and execute program instructions, e.g., program instructions provided on a memory medium such as a set of one or more CD-ROMs and loaded into semiconductor memory at execution time. The non-transitory computer readable device, 506 may be coupled wired or wireless to memory resource 503 through the communication bus 504 (or through a collection of busses). In response to the program instructions, the non-transitory computer readable memory device, 506 may operate on data stored in one or more memory resource 503. The non-transitory computer readable memory device, 506 may include one or more programmable processors (e.g., microprocessors).

A "computer program product or computing system device" includes the direct act that causes generating, as well as any indirect act that facilitates generation. Indirect acts include providing software to a user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, an LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

According to the preferred embodiment of the present invention, certain hardware, and software descriptions were detailed, merely as example embodiments and are not to limit the structure of implementation of the disclosed embodiments. For example, although many internal, and external components have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

It is to be noted that, as used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

Also, the term "executing" encompasses a wide variety of actions, including calculating, determining, processing, deriving, investigation, look ups (e.g. looking up in a table, a database or another data structure), ascertaining and the like. It may also include receiving (e.g. receiving information), accessing (e.g. accessing data in a memory) and the like. "Executing" may include computing, resolving, selecting, choosing, establishing, and the like.

Acquiring certain data may include creating or distributing the referenced data to the subject by physical, telephonic, or electronic delivery, providing access over a network to the referenced data, or creating or distributing software to the subject configured to run on the subject's workstation or computer including the reference image. In one example, acquiring of a referenced data or information could involve enabling the subject to obtain the referenced data or information in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

| Symbols Table | |
|---|---|
| Symbol | Brief Definition |
| F | the operator that contains all the local wavelets |
| m | the coefficient model at well location |
| Δd | the data difference between the global wavelet and the local wavelet |
| Ψ | the multivariate regression objective function |
| p | the weighting parameter |
| v | the average correlation maps |
| N | the number of well locations |
| M | the number of coefficients |
| i | the index of coefficient |
| j | the index of well location. |
| k | the index of reflection angle. |
| C | the interpolated coefficient models. |
| $w_G$ | the global angle dependent wavelet. |
| $w_L$ | the local angle dependent wavelets. |
| w | the spatial varying angle dependent wavelets. |
| x | a given point in the survey region based on the values set up, extracted, and imported. |

What is claimed is:

1. A method for interpolating wavelet coefficients and for generating spatial varying angle dependent wavelets in a data space over an entire survey region having multiple locations for hydrocarbon identification in the survey region, wherein the method comprises:

positioning seismic data recording sensors in the survey region;

generating sound waves from points of incidence in the survey region;

retrieving, using the seismic data recording sensors, seismic data and processing the seismic data to generate prestack seismic data;

collecting well log data from a wellbore and processing the well log data to generate upscaled well log data;

transmitting the prestack seismic data and upscaled well log data to at least one memory, wherein the at least one memory comprising instructions and at least one hardware processor to execute the instructions stored in the at least one memory to implement:

importing prestack seismic data from the survey region having multiple well locations;

importing upscaled well log data from the survey region having multiple well locations;

extracting a global angle-dependent wavelet from the imported prestack seismic data and from the imported upscaled well log data over the entire survey region, using statistical wavelet extraction and seismic-to-well tie, then calibrating reflectivity coefficients obtained from the imported upscaled well log data over the entire survey region, represented in time domain;

extracting a set of local angle-dependent wavelets from the imported prestack seismic data and from the imported upscaled well log data over each well location, using statistical wavelet extraction and seismic-to-well tie, then calibrating reflectivity coefficients obtained from the imported upscaled well log data at each well location, represented in time domain;

computing a least-square coefficient model for each well location of the survey region, using the extracted global angle-dependent wavelet and the extracted set of local angle-dependent wavelets;

generating a three-dimensional coefficient model from the computed least-square coefficient model for each well location;

interpolating the second dimension of the generated three-dimensional coefficient model from each well location to the entire survey region;

generating an updated least-square coefficient model from the interpolated second dimension of the generated three-dimensional coefficient model of each well location to the entire survey region;

interpolating the generated updated least-square coefficient model of each well location to the entire survey region and the location from the imported prestack seismic data from the survey region, using the covariance analysis technique;

generating a final least-square interpolated coefficient model from the interpolated updated coefficient model for every reflection angle traces in the survey region having multiple well locations;

generating the spatial varying angle dependent wavelets using the generated final interpolated coefficient model; and processing to identify the hydrocarbon in the survey region based on the spatial varying angle dependent wavelets.

2. The method of claim 1, wherein the well log data comprises P-wave velocity, S-wave velocity, and density.

3. The method of claim 1, wherein the data space of the survey region includes seismic data, velocity data, and well log data.

4. The method of claim 1, wherein the prestack seismic data comprises post-migrated angle image gathers with reflection angle traces as the horizontal axis and time as the vertical axis, and wherein the upscaled well log data comprises P-wave velocity, S-wave velocity, and density data in the time domain.

5. The method of claim 1, wherein the extracting the global angle-dependent wavelets for the survey region and extracting the local angle-dependent wavelets for each well location, further comprise angle-dependent wavelets including a group of wavelets having reflection angle traces in the horizontal axis and time data in the vertical axis.

6. The method of claim 1, wherein the computing a least-square coefficient model for each well location of the survey region, using the extracted global angle-dependent wavelet and the extracted set of local angle-dependent wavelets, further comprises:

selecting the set of extracted global angle-dependent wavelets for the survey region, and the extracted set of local angle-dependent wavelets for each well location;

selecting a well location from the survey region;

computing the least-squares optimization for coefficient model according to the expression:

$$d = Fm;$$

repeating the steps of selecting the well location from the survey region and computing the least-squares optimization until all well locations from the survey region have been selected;

repeating the step of selecting the extracted global angle-dependent wavelets for the survey region and the extracted set of local angle dependent wavelets for all well locations, the step of selecting the well location from the survey region and the step of computing the least-squares optimization until all local angle-dependent wavelets for all well locations have been selected; and generating a linear equation system for each local angle-dependent wavelet by computing the difference between the global angle-dependent wavelets and each local angle-dependent wavelet the reflection angle traces, with the computed least-square coefficient model according to the expression:

$$\Psi = \min \|Ad - Fm\|_2.$$

7. The method of claim 1, wherein the generating a three-dimensional coefficient model from the computed least-square coefficient model for each well location includes storing the three-dimensional coefficient model as a three-dimensional table including a coefficient index as the first dimension, a well location as a second dimension, and a reflection angle seismic trace as a third dimension.

8. The method of claim 1, wherein the interpolating the generated updated least-square coefficient model of each well location to the entire survey region and the location from the imported prestack seismic data from the survey region using the covariance analysis technique, further comprises:

extracting a set of angle image gathers from the imported prestack seismic data from the survey region having multiple well locations and common image locations;

selecting a well location from the survey region;

extracting an angle image gather from the selected well location;

selecting a common image location from the survey region having the selected well location;

extracting an angle image gather from the selected common image locations;

extracting a reflection angle seismic trace for the extracted angle image gather of the selected well location and a reflection angle seismic trace from the extracted angle image gather of the selected common image location;

computing a correlation coefficient between the extracted reflection angle seismic traces of the selected well and the selected common image location;

repeating the steps of selecting the common image location, extracting the image gather from the selected common image location, extracting the reflection angle image trace from the extracted image gather of the selected common image location, and computing the correlation coefficient map between the extracted reflection angle seismic traces of the selected well and the selected common image location until all reflection angle seismic traces from all extracted image gathers of all selected common image location have been extracted;

generating a correlation map by inputting the computed correlation coefficients between the extracted reflection angle seismic trace of the selected well, and all extracted reflection angle seismic traces from all selected common image location;

repeating the steps of selecting the well location from the survey region, extracting the angle image gather from the selected well location, selecting the common image location, extracting the image gather from the selected common image location, extracting the reflection angle image trace from the extracted image gather of the selected common image location, and computing the correlation coefficient map between the extracted reflection angle seismic traces of the selected well and the selected common image location until all reflection angle seismic traces from all extracted image gathers of all selected well location, and all reflection angle seismic traces from all extracted angle image gathers of all selected common image location have been extracted;

generating a set of correlation maps by inputting the computed correlation coefficients between the extracted reflection angle seismic trace of all the selected well, and all the extracted reflection angle seismic traces from all the selected common image location;

computing a set of two-dimensional average correlation maps from the generated set of correlation coefficient maps by averaging over angle axes of the extracted image gathers of all selected well locations and the extracted angle image gathers of all selected common image location;

generating a set of average correlation maps at each well location of the survey region;

computing a set of interpolated weighting parameters from the generated set of average correlation maps at each well location of the survey region;

generating a set of weighted parameters from the computed set of interpolated weighting parameters; and computing an interpolated coefficient model using the generated set of weighted parameters and the generated updated least-square coefficient model.

9. The method of claim 1, wherein the computing a set of interpolated weighting parameters from the generated set of average correlation maps, comprises the expression:

$$p_i(x) = \begin{cases} \dfrac{\hat{v}_i(x)}{\sum_{i=1}^{N}\hat{v}_i(x)}, \\ 1, \end{cases}$$

10. The method of claim 1, wherein the computing the interpolated coefficient model for every reflection angle traces, using the generated set of weighted parameters and the computed least-square coefficient model for each well location of the survey region, further comprises the expression:

$$C_{ik}(x)=\Sigma_{j=1}^{N}p_j(x)C_{ijk}.$$

11. The method of claim 1, wherein the generating the set of spatial varying angle dependent wavelets using the generated interpolated coefficient model, further comprises the expression:

$$w_k(x)=w_G^{k}+\Sigma_{i=1}^{M}C_{ik}(x)w_L^{ik}.$$

* * * * *